United States Patent
Willoughby et al.

(10) Patent No.: US 11,487,631 B2
(45) Date of Patent: Nov. 1, 2022

(54) DATA REFRESH IN A REPLICATION ENVIRONMENT

(71) Applicant: INTERNATIONAL BUSINESS MACHINES CORPORATION, Armonk, NY (US)

(72) Inventors: Austin Willoughby, Poughkeepsie, NY (US); Paul M. Cadarette, Hemet, CA (US); Gregg Andrew Upton, Santa Clara, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 348 days.

(21) Appl. No.: 16/830,766

(22) Filed: Mar. 26, 2020

(65) Prior Publication Data

US 2021/0303420 A1 Sep. 30, 2021

(51) Int. Cl.
*G06F 11/14* (2006.01)
*G06F 11/30* (2006.01)
(Continued)

(52) U.S. Cl.
CPC ...... *G06F 11/1471* (2013.01); *G06F 11/0772* (2013.01); *G06F 11/1438* (2013.01);
(Continued)

(58) Field of Classification Search
None
See application file for complete search history.

(56) References Cited

U.S. PATENT DOCUMENTS

| 5,452,448 A | 9/1995 | Sakuraba |
| 6,304,882 B1 * | 10/2001 | Strellis ............... G06F 11/2064 |
| | | 714/E11.107 |

(Continued)

FOREIGN PATENT DOCUMENTS

JP 5258885 B2 8/2013

OTHER PUBLICATIONS

Mell, Peter, et al., "The NIST Definition of Cloud Computing", NIST Special Publication 800-145, Sep. 2011, Gaithersburg, MD, 7 pgs.

(Continued)

*Primary Examiner* — Yaima Rigol
(74) *Attorney, Agent, or Firm* — Rakesh Roy; Matthew M. Hulihan; Heslin Rothenberg Farley & Mesiti PC

(57) ABSTRACT

Data refresh in a replication environment is provided by: reading, by a data services component of a replication environment as part of a data refresh operation, a data store and identifying refresh data, from a source object of source objects of the data store, that is to be provided to a target system, where the data services component is further configured to read a replication log into which changes to source object(s) of the source objects are recorded, and send the changes as change data records to a capture service; and retrieving, by the data services component, the refresh data from the source object and sending the refresh data as refresh data records to the capture service, where the capture service is configured with data record handling routines for applying to received change data records and to the received refresh data records.

20 Claims, 6 Drawing Sheets

(51) Int. Cl.
*G06F 11/07* (2006.01)
*G06F 16/23* (2019.01)
*G06F 16/27* (2019.01)

(52) U.S. Cl.
CPC ...... *G06F 11/1451* (2013.01); *G06F 11/1464* (2013.01); *G06F 11/1469* (2013.01); *G06F 11/3037* (2013.01); *G06F 16/2358* (2019.01); *G06F 16/2365* (2019.01); *G06F 16/27* (2019.01); *G06F 2201/80* (2013.01)

(56) References Cited

U.S. PATENT DOCUMENTS

| | | | |
|---|---|---|---|
| 6,792,540 | B1 | 9/2004 | Smith et al. |
| 7,284,019 | B2 | 10/2007 | Adkins et al. |
| 7,339,657 | B2 | 3/2008 | Coates |
| 7,509,354 | B2 | 3/2009 | McGarvey |
| 7,809,691 | B1 | 10/2010 | Karmarker et al. |
| 8,671,074 | B2 * | 3/2014 | Wang ............... G06F 11/2097 707/634 |
| 10,013,316 | B2 | 7/2018 | Cadarette et al. |
| 10,776,211 | B1 * | 9/2020 | Natanzon ............ G06F 11/1464 |
| 2011/0231358 | A1 | 9/2011 | Boyko et al. |
| 2017/0046232 | A1 * | 2/2017 | Cadarette ............ G06F 11/1469 |
| 2017/0255529 | A1 * | 9/2017 | Kedia ................ G06F 11/2097 |
| 2019/0325055 | A1 * | 10/2019 | Lee ..................... G06F 3/0644 |

OTHER PUBLICATIONS

"About CDC Replication", retrieved on Mar. 17, 2020 from the Internet URL: <https://www.ibm.com/support/knowledgecenter/SSTRGZ_11.3.3/com.ibm.cdcdoc.sysreq.doc/concepts/aboutcdc.html?pos=3>, IBM Knowledge Center, 4 pgs.

"Starting a refresh on a subscription", retrieved on Mar. 17, 2020 from the Internet URL: <https://www.ibm.com/support/knowledgecenter/SSTRGZ_11.3.3/com.ibm.cdcdoc.mcadminguide.doc/tasks/startrefresh.html>, IBM Knowledge Center, 5 pgs.

"Performing an external refresh", retrieved on Mar. 17, 2020 from the Internet URL: <https://www.ibm.com/support/knowledgecenter/SSTRGZ_11.3.3/com.ibm.cdcdoc.cdcforinformix.doc/tasks/performanexternalrefresh.html>, IBM Knowledge Center, 4 pgs.

"Refresh", retrieved on Mar. 17, 2020 from the Internet URL: <https://www.ibm.com/support/knowledgecenter/SSTRGZ_11.3.3/com.ibm.cdcdoc.glossary.doc/glossary_terms/refresh.html>, IBM Knowledge Center, 2 pgs.

"Differential Refresh", retrieved on Mar. 17, 2020 from the Internet URL: <https://www.ibm.com/support/knowledgecenter/SSTRGZ_11.3.3/com.ibm.cdcdoc.glossary.doc/glossary_terms/differentialrefresh.html>, IBM Knowledge Center, 2 pgs.

"Loading target tables for Q Replication", retrieved on Mar. 17, 2020 from the Internet URL: <https://www.ibm.com/support/knowledgecenter/SSTRGZ_11.4.0/com.ibm.swg.im.iis.repl.qrepl.doc/topics/iiyrqlodcovrview.html>, IBM Knowledge Center, 3 pgs.

"Replicating load operations at the source table", retrieved on Mar. 17, 2020 from the Internet URL: <https://www.ibm.com/support/knowledgecenter/SSTRGZ_11.4.0/com.ibm.swg.im.iis.repl.qrepl.doc/topics/iiyrqsubreplload.html>, IBM Knowledge Center, 4 pgs.

"Understanding the InfoSphere Classic CDC for z/OS workflow", retrieved on Mar. 17, 2020 from the Internet URL: <https://www.ibm.com/support/knowledgecenter/SSTRGZ_11.3.3/com.ibm.cdcdoc.classiccdcforzos.doc/concepts/understanding_classic_cdc_for_z_os_workflow.html>, IBM Knowledge Center, 4 pgs.

"Refreshing your replication environment", retrieved on Mar. 17, 2020 from the Internet URL: <https://www.ibm.com/support/knowledgecenter/SSTRGZ_11.3.3/com.ibm.cdcdoc.classiccdcforzos.doc/concepts/iiycdcrefreshproc.html>, IBM Knowledge Center, 3 pgs.

"Send Existing Data to New Target", retrieved on Mar. 17, 2020 from the Internet URL: <http://portal.sqdata.com/portal/docs/Version3/Help/V3_WebHelp/index.html?vsam_send_existing_data_to_new_target.htm>, 1 pg.

"Connect CDC", retrieved on Mar. 17, 2020 from the Internet URL: <https://www.syncsort.com/en/products/connect-cdc>, SyncSort, 6 pgs.

"Universal data replication and data ingestion", retrieved on Mar. 17, 2020 from the Internet URL: <https://www.qlik.com/us/products/attunity-replicate>, Qlik Q, 13 pgs.

"Persistent Subscription", retrieved on Mar. 17, 2020 from the Internet URL: <https://www.ibm.com/support/knowledgecenter/SSTRGZ_11.4.0/com.ibm.cdcdoc.glossary.doc/glossary_terms/persistentsubscription.html>, IBM Knowledge Center, 2 pgs.

"Making subscriptions persistent", retrieved on Mar. 17, 2020 from the Internet URL: <https://www.ibm.com/support/knowledgecenter/SSTRGZ_11.4.0/com.ibm.cdcdoc.mcadminguide.doc/tasks/markasubscriptionaspersistent.html>, IBM Knowledge Center, 3 pgs.

"Network connection resiliency", retrieved on Mar. 17, 2020 from the Internet URL: <https://www.ibm.com/support/knowledgecenter/SSTRGZ_11.4.0/com.ibm.cdcdoc.planningadeployment.doc/concepts/networkconnectionresiliency.html>, IBM Knowledge Center, 3 pgs.

* cited by examiner

DATA REFRESH IN A REPLICATION ENVIRONMENT

BACKGROUND

Replication products require seeding data in a target data store of a target system before replicating changes to avoid data inconsistencies. This provides a starting point for the target data store to receive on-going changes through replication. Re-seeding the target data store may also be necessary if there is a problem that causes inconsistencies. Typically, replication products provide one or both of an internal refresh option and an external refresh option.

The internal refresh option is controlled within the replication product, which accesses the source data in a source data store and sends the data to the target system. The target system may additionally or alternatively pull the source data. An internal refresh offers a convenience for users in that the replication product does the work of accessing and formatting source data for the target data store.

The external refresh option is largely controlled by the user. The user will use a known copy of the source data to create a point-in-time consistent target copy by transferring the source data to the target system and formatting the source data for the target data store. The user and the external tooling used are responsible for ensuring that the data matches, in order to avoid data inconsistencies during replication.

SUMMARY

Shortcomings of the prior art are overcome and additional advantages are provided through the provision of a computer-implemented method. The method reads, by a data services component of a replication environment as part of a data refresh operation, a data store and identifies refresh data, from a source object of a plurality of source objects of the data store, that is to be provided to a target system. The data services component is further configured to read a replication log into which changes to one or more source objects of the plurality of source objects are recorded. The data services component if further configured to send the changes as change data records to a capture service of the replication environment. The method also retrieves, by the data services component, the refresh data from the source object and sends the refresh data as refresh data records to the capture service of the replication environment. The capture service is configured with data record handling routines for applying to received change data records. The capture service is further configured to apply those data handling routines to the received refresh data records.

Further, a computer system is provided that includes a memory and a processor in communication with the memory, wherein the computer system is configured to perform a method. The method reads, by a data services component of a replication environment as part of a data refresh operation, a data store and identifies refresh data, from a source object of a plurality of source objects of the data store, that is to be provided to a target system. The data services component is further configured to read a replication log into which changes to one or more source objects of the plurality of source objects are recorded. The data services component if further configured to send the changes as change data records to a capture service of the replication environment. The method also retrieves, by the data services component, the refresh data from the source object and sends the refresh data as refresh data records to the capture service of the replication environment. The capture service is configured with data record handling routines for applying to received change data records. The capture service is further configured to apply those data handling routines to the received refresh data records.

Yet further, a computer program product including a computer readable storage medium readable by a processing circuit and storing instructions for execution by the processing circuit is provided for performing a method. The method reads, by a data services component of a replication environment as part of a data refresh operation, a data store and identifies refresh data, from a source object of a plurality of source objects of the data store, that is to be provided to a target system. The data services component is further configured to read a replication log into which changes to one or more source objects of the plurality of source objects are recorded. The data services component if further configured to send the changes as change data records to a capture service of the replication environment. The method also retrieves, by the data services component, the refresh data from the source object and sends the refresh data as refresh data records to the capture service of the replication environment. The capture service is configured with data record handling routines for applying to received change data records. The capture service is further configured to apply those data handling routines to the received refresh data records.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
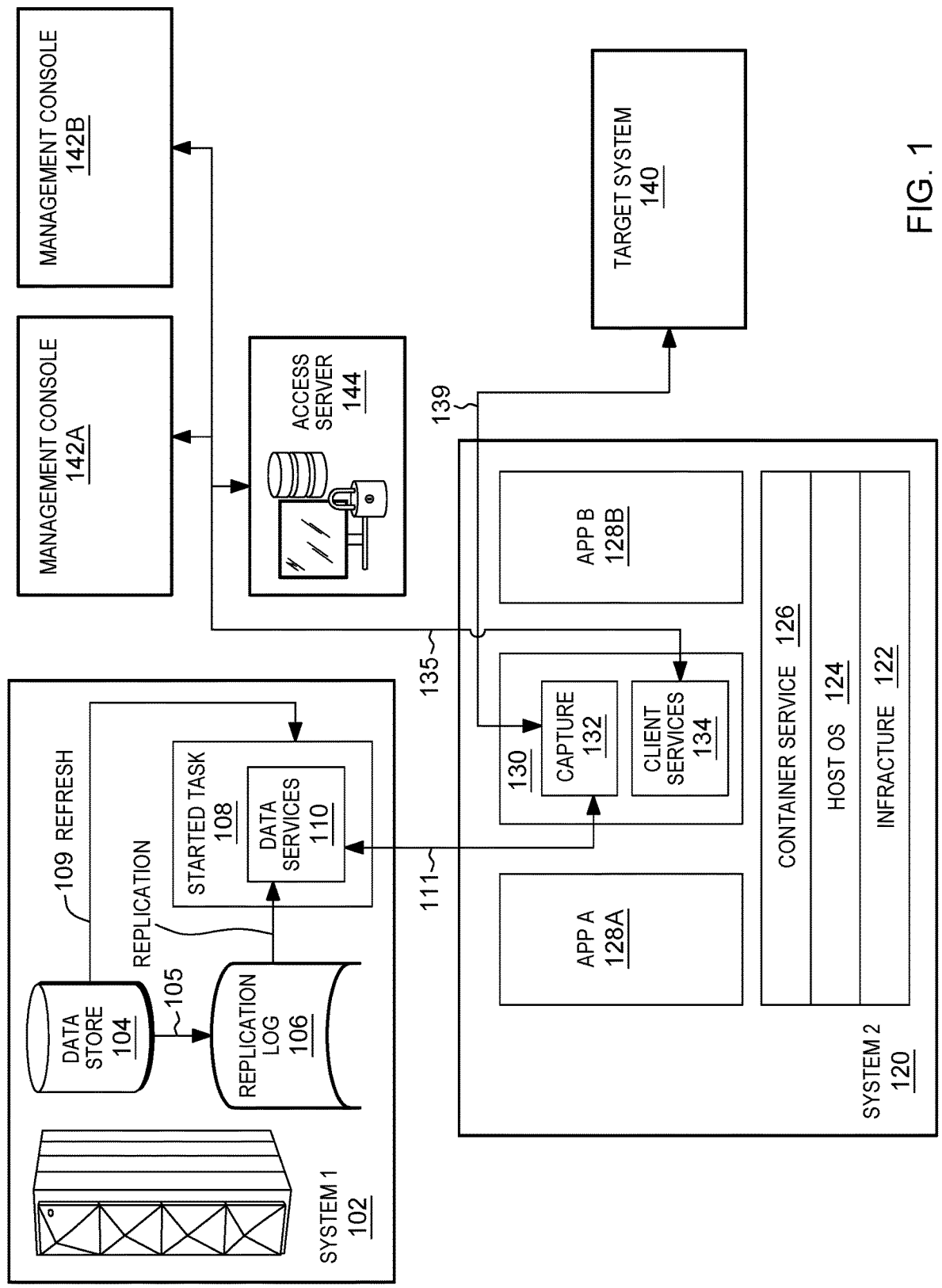
FIG. 1 depicts an example replication environment to incorporate and use aspects described herein.

Potential drawbacks to the internal refresh approach exist due to requirements and configuration for source data access. There are also performance implications due to limitations in how source data is refreshed to the target using a general data access approach that may not take advantage of optimizations available in the source data store access methods. Meanwhile, the external refresh approach requires more effort on the part of the replication user, but may perform better, especially for larger data sources.

Described herein are approaches to address issues with existing replication systems, particularly internal refresh facilities thereof, that result from the conventional data refresh path being different from the conventional data replication path. In some known implementations for data replication, the data refresh path used to seed the target data store is different from the data replication path used to replicate change data from the same source object. Having two paths can necessitate different data record handling routines that user must write/use to cause equivalent behavior when keys are refreshed and when changes to the keys are replicated. Example such routines include exit handling, data transformations, flow control, and bad data handling, as examples.

In accordance with aspects presented herein, a refresh stream is proposed that enables the records read during refresh to flow through at least some of the data record handling routine(s) that apply to change data records during replication thereof. One advantage is that it reduces the complexity and maintenance cost in making changes to the replication system since there are not two wholly distinct paths (refresh data path, change data path, extending separately between the source and target) to address and verify as being consistent. Additionally, this opens new possibilities for sending previously unsupported source data through as refresh data while still taking advantage of available data record handling routines, such as those for the mentioned transformations, exits, flow control, and bad data handling.

Advances proposed include the use of refresh streams to send refresh data through a replication system. Existing approaches in this technology area involve either a 'target pull' by the target system, or a 'source pull' in which a capture service of the replication system pulls the data from the source data store just before sending to the target. The latter scenario is typically handled by a query processor that pulls the data via a query, formats it and then sends it without utilizing capture service data handling processing. This and other conventional approaches flow the refresh data around the replication data path, which refers to the path through which change data (also referred to herein as "replication data") flows.

In contrast, aspects described herein present a pull approach that, instead of immediately sending the refresh data to the target, allows it to flow through the replication system as if data were a captured transaction flagged for refresh. In some aspects, a data services component responsible for log reading is the component that pulls refresh data from the source data store and pushes it to the capture service/engine just is it would push change data records built from the replication log.

Aspects described herein are also distinct from an approach that refreshes through log injection, in which an external component puts data into the replication stream, specifically the replication log, for refresh purposes. Such approach is an 'external push' approach that does not use a refresh stream and may not be a good fit for certain existing replication protocols requesting a data refresh.

A replication refresh strategy as disclosed herein reads the source data store for an object and sends refresh data as records through a refresh stream. Groups of records can be built into manufactured 'Units-Of-Recovery' (UORs) that may be staged through the existing replication path as pseudo-transactions.

FIG. 1 depicts an example replication environment to incorporate and use aspects described herein. The environment can implement a replication system/environment with components performing processes as described herein. Environment 100 includes system 1 (102), which in one particular example is of the z/Architecture® running the z/OS® operating system (offered by International Business Machines Corporation, Armonk, N.Y., of which Z/ARCHITECTURE and Z/OS are registered trademarks). System 102 hosts a source data store 104. As a particular example, the data stored in data store 104 may conform to the Virtual Storage Access Method (VSAM) used for storing and accessing data sets, and thus may be or include one or more VSAM files.

Replication log 106, which can also be referred to as a change log and/or transaction log, is a log of changes made to the data records in the source data store. Per known replication approaches, the changes can be indicated via path 105 to the replication log 106, which buffers changed records for transmission to a target system.

A started task 108 running on system 102 executes/implements a data services component 110. The data services component 110 communicates via communication path(s) 111, for instance TCP/IP or other wireless/wired connection(s), with a capture service 132 of system 2 (120). System 120 may of a same or different system hardware and/or software architecture as system 102. In a particular example, system 120 runs the Red Hat® Enterprise Linux® (RHEL) operating system (offered by Red Hat, Inc., Raleigh, N.C., of which RED HAT and ENTERPRISE LINUX are registered trademarks). System 120 includes a hardware infrastructure 122 executing a host operating system 124 (such as RHEL), above which a container 126 executes. The container 126 executes application A (128A) and B (128B) as well as a change data capture (CDC) component 130. The CDC component 130 includes capture service 132 and client services 134. Client services 134 provide access to the CDC component 130 by access server 144 and management consoles 142A, 142B via graphical user interface (GUI) tools for administration and monitoring across communication path(s) 135. With further explanation below, capture service 132 communicates with target system(s), such as target system 140, via communication path(s) 139 to send data to the target system. The data may be change data and/or refresh data for applying to a target data store of target system 140. In particular examples, the target system is or includes an 'apply engine' for applying received data to a database management system, message queue, Extract-Transform-Load (ETL) system, flat file(s), and/or a service-oriented architecture (SOA), as examples. The target system may be of any system hardware/software architecture.

The data services component 110 is the log reader component that reads replication log 106 for sending changes to the capture service 132. In accordance with aspects described herein, functionality of the data services component 110 is extended such that it pulls refresh data directly from data store 104. During a refresh operation, refresh data is pulled by data services component 110 from data store 104 (see Refresh path 109) into the data services component, which is functioning also as the log reader component. However, the refresh data is not being read-out of the log path (i.e. from the replication log) but is instead read directly from data store 104 for refresh purposes. Then, consistent with the data service component's push of change data records to capture service 132, the data services component 110 also pushes the refresh records to capture service 132. In this example, both types of records flow via path(s) 111 to capture service 132.

Accordingly, aspects include a data services component (such as a VSAM data services component) of a replication environment reading, as part of a data refresh operation, a data store, such as a VSAM or other type of file, a database, or any other entity that stores data. The data services component identifies refresh data from one or more source objects of the data store, the refresh data to be provided to a target system. The data services component is further configured to read a replication log into which changes to source object(s) are recorded. These source object(s) may or may not be the same object(s) from which the refresh data is identified. In other words, the data store has source object(s) for refresh and source objects being logged for change data capture, but the source object(s) being refreshed may or may not be included in the set of objects being logged. The data services component is also configured to send those changes as change data records to a capture service of the replication environment. Thus, the data services component both reads and identifies the refresh data from the source data store, and performs replication log reader functions. In addition, the data services component retrieves the refresh data from source object(s) and sends the refresh data as refresh data records to the capture service of the replication environment. Overlap between the refresh path (data store→data services component→capture service . . . ) and the replication path (data store→replication log→data services component→capture service . . . ) is provided thereby in that the refresh and change data records are both send by the data services component to the capture service in order to leverage various data record handling routines of the capture service for both refresh data records and change data records.

The data refresh operation can be scoped to provide a range or differential refresh based on the data services component processing the data refresh records, which can include filtering the source object data by some key value and/or sorting the data refresh records by a key, as examples.

The capture service 132 includes various data record handling routines that it can apply to change data records pushed to it from the data services component 110. Example such routines include processing for exit handling, data transformations, caching, flow control, bad data handling, blocking/throttling sending changes to the target, and others. In accordance with aspects described herein, these routines may also be applied to refresh data records received from data services component 110. Program code of the routines may be adjusted as necessary to apply to both types of records, but practically speaking these adjustments may be minor. In particular examples, the capture service handles refresh data records as though they are like 'INSERTS' observed in change data records, and therefore these routes can apply to the refresh information being sent to capture service 132. The processing of the refresh and change data records may therefore be done in a consistent manner regardless of whether replicating or refreshing data from the source data store.

In this manner, the capture service is configured with data record handling routines for applying to received change data records, and the capture service is further configured to apply those data handling routines to the received refresh data records.

With respect to communication path 111, practically speaking this can include a path for the refresh stream of refresh data records when refresh is active and a path for the replication stream of change data records.

As part of sending the refresh data as refresh data records to the capture service by the data services component, this can include grouping subsets of the refresh data records into corresponding transactions for processing by the capture service data record handling routines for then staging and sending to the target system as refresh transaction data flagged for refresh. In this approach, refresh records from the capture cache of the capture service are grouped into created refresh groups and sent to the target. A group of refresh data can be sent to the target as a UOR or unit of work. The target can be configured to recognize a specific message type corresponding to refresh data in contrast to CDC data (insert, update, or delete). This can be useful because there may be specific protocols to follow at the target when dealing with refresh data as opposed to handling CDC data. An example is truncating a target table, which is typical activity in a refresh operation. With UOR tracking, this can help ensure that only committed work is sent to target. When a first change for a UOR or commit scope is seen, tracking is started on the changes that are part of that transaction into the same group. The changes can then be sent to the target when they are committed, or the changes can be discarded by the capture service if the changes are rolled back. Handling of refresh records in transactions allows leveraging the replication data handling routines that already operate on transactions in the capture service. It also can help make refresh restart potential possible as is presented in further detail herein.

Some prior art refresh approaches would read a dataset's refresh data (select * from [dataset]) and send it to the target, perhaps with some formatting. However, the refresh records under such approach do not flow through with replication records to the capture service and are not cached into a capture cache thereof. Thus, the data record handling routines applied by the capture service to change data records are therefore not applied to refresh data records.

In the example of FIG. 1, refresh stream(s) and change stream(s) exist between the data store 104, data services component 110, and the capture service 132 in the container on system 120. System 102 and system 120 collectively conceptually represent the source side, as opposed to the target side represented by target system 140. Systems 102 and 120 could be separate physical servers, or system 120 could be running on a server system 102. In either case, a communication path 111 between data services component 110 and capture service 132 is present. This is just one embodiment to demonstrate aspects presented, and is not intended to be limiting on the scope of the disclosure in any way.

The data services component could therefore execute on a first system of a first system architecture and the capture service could execute on a second system of a second system architecture different from the first system architecture. The data services component provides the change data records and the refresh data records to the capture service via a transmission channel, such as a TCP/IP connection, between the first system and the second system. Alternatively, systems 102 and 120 could be implemented as different nodes on a common physical system, still with a transmission channel between them.

It is seen that the data services component 110 of the replication system pulls the refresh data from the source object, but does so closer to the log reading facility (also of the data services component 110) so that both the refresh data records and change data records may be pushed to the capture service 132 for subsequent processing. As noted, other approaches might see the capture service/engine pull refresh data indirectly through a query processor. In such an approach, the refresh data is pulled at the capture point and, practically speaking, is pulled closer to the outbound side of capture processing rather than being pulled through an inbound side (e.g. received as input like change data records for data handling). In contrast, aspects described herein pull refresh data by the log reader component (data services 110 here) or at the log reader point and push them through to the source side of the capture component for processing and delivery to the target. This is virtually the same input as where change data records are fed into the replication system for downstream processing/application at the target. The downstream processing may be aware of the difference between refresh data records and change data records, but could largely process the manufactured refresh data UORs the same as captured change data UORs. Refresh stream data records can be formatted into linear buffers that match the form of linear buffers created from data captured due to source object changes received on the change stream, meaning that the format used by CDC changes flowing to the capture service can be the format used for refresh data records, thereby enabling the capture service to handle the received records it the way it would a change data record. The capture service can effectively treat a refresh data record as an "after image". The same data transformations, exits/exit handling, flow control, and bad data handling (as examples) acting on change data can act upon the refresh stream data, and these refresh records can be treated similarly to an insert found in the change stream.

By providing refresh streams in this manner, refresh data follows a similar path as that of captured change data in replication change streams. One benefit is consistent behavior for both refresh and replication data, and common data manipulations applied by the capture service can be available for both. Similarly, any exits written can apply to both types of data, removing any oddities or differences between the separate exit points for refresh and replication data.

Using a refresh stream also opens the possibility for refreshing multiple source objects at the same time if the replication protocols and downstream targets support that processing. Example situations include when data of one source object is fanned to multiple targets or filtered across multiple targets using multiple replication mappings. This can be advantageous if a single refresh stream record or pass through the data can be used to populate all the replication mappings related to the source object. The source object of the data store can be read once, and refresh data provided by the capture service to multiple target objects, e.g. corresponding to multiple subscriptions that might exist to that source object. One record could flow from data service component 110 to capture service 132 even if there is an 'apply' to two or more target objects at one or different target systems. The capture service 132 could see two subscriptions or two table mappings that reference that data record that was sent, and then send it to each target. Parallel refresh is thereby possible with the refresh stream approach using the same fanning or filtering provided by the replication system, rather than having the refresh processing pull records by replication mapping.

Accordingly, the capture service can receive refresh data records and send data of the refresh data records for application to a plurality of different target objects. The different target objects could be on one target system or two or more different target systems, in which case the capture service sends data of the refresh data records to the different target systems.

Using the refresh stream approach set forth herein provides flow control automatically for refresh streams and their data records by reusing logic built-in for replication change streams. Flow control mechanisms may be in place to avoid the sending system overrunning the downstream components and that can be reused during refresh processing to avoid the same.

Refresh is possible for any data that can be formed into records. Thus, the source object for the refresh data can be a source object for which changes are being monitored and logged into the replication log. However, refresh is also possible even if the data type does not log its changes. If the data in the data store can be read or somehow acquired and formatted into records, then it can be refreshed to the target as a logical source table. The logical source table can be an aggregate of data sources (federated data) or a simpler direct read of the data. It may be possible to identify a time-based column for non-logged sources that allows the refresh stream feeder to determine and send only keys modified after the last refresh to reduce the data transferred. Not all data has a field such as "last updated", but when it does, an advantage is provided for the refresh utility to be able to identify that and skip re-sending unchanged data if the target desires to update its feed and does not need a complete refresh. This would not address deleted records, but there may be some use cases for desiring updated records at the target without concern about "extra" keys—for instance if they are transaction history records that are only accessed when the key is requested, which is found through another table that does replicate deletes, as an example.

Thus, any data that can be read and formed into "records" can be refreshed; it does not matter whether the particular source object(s) of the refresh are, or are not, part of the source object(s) against which change data capture is being performed. If the source object is non-logged, changes to the source object are not recorded into the replication log for retrieval and sent as change data records by the data services component to the capture service. Nevertheless, the refresh data may be retrieved from the source object and sent as refresh data records to the capture service for data record handling as objects indicated as being refresh-only objects. Refresh data may be obtained from a point-in-time version of the data to be sent through a refresh stream to be handled by the capture service data handling routines as objects marked as refresh-only objects. Sources that were previously not available to the replication system can now be periodically refreshed if the reader of the data can manage it. These sources can be refreshed through refresh streams, taking the replication path through the capture service as does the previously supported data types and therefore being subject to processing by the existing data handling/manipulation options. Target systems could see the refresh data as coming from a logical table, and therefore where actual source data comes from (one data source, multiple, federated sources, etc.) is immaterial. It is possible to refresh sequential files, for instance, such that the targets will see the refresh data coming from the capture service without knowledge of the source from which the capture service receives the data. In these situations, the replication system source object reader is to understand how to build "records" for the data object conforming to, e.g., a linear representation of the logical row in the logical table. These types of replication mappings could be flagged as "refresh-only", since data capture is not occurring in the non-logged scenario. Flagging (in metadata for instance) that a particular table mapping is refresh-only can be useful as it may be desired by the target to treat refresh data differently from CDC data. As an example, when viewing replication system information through a GUI tool for administration (e.g. a management console 142A), the GUI can present proper options for the refresh data as opposed to options for change data capture data. In some embodiments where there is a refresh-only mapping, the target system will not see an insert, update, delete, or commit record, for instance, as those are CDC changes.

Generally, refresh processing cannot be restarted or recovered from cached data; a refresh operation is usually restarted from the beginning of the source data object. Any unhandled bad data, for example, would lead to a subscription being placed in error and requiring restart from the beginning, presumably with some mapping or configuration change to address the problem data. Other non-recoverable errors are managed similarly by restarting refresh of the object from the beginning.

However, an exception for refresh restart from the cache as described herein presents an advantage of refresh stream processing and caching of manufactured refresh UORs. If the connection to the target server (i.e. between the capture service and the target system) is broken, the source 'server' (i.e. 130 in FIG. 1) may attempt to periodically reconnect using the concept of subscription/refresh persistency.

When the communication protocol supports refresh persistency, it may be possible to restart/resume the refresh from the cached data stored from the refresh stream when it can be determined that no data will be lost due to the broken connection. This determination can be made by confirming the last refresh group (UOR) applied by the target is still in the source capture cache of the capture service. When that is confirmed, the refresh operation may resume with the sequentially-next UOR in the capture cache from the refresh stream. Thus, in accordance with aspects described herein, the capture service can cache refresh data records in a capture cache and build from the cached refresh data records groups (UORs) of refresh data into units of recovery for staged sending to the target system. The capture service can further perform tracking sending of the units of recovery to the target system. As some point, the data refresh operation may be interrupted (e.g. a connection between the capture service and the target system goes down). Based on this, and after the connection is subsequently reestablished, the target system can send an indication of a latest unit of recovery that the target system applied. This can be referred to as a bookmark and indicates which UOR was the last one successfully applied at the target. The target can be configured to track such bookmark information. The capture service can receive that indication and, on that basis, figure out where refresh should be resume, i.e. which UOR is the sequentially-next UOR for delivery to the target for application to the target data store(s). The capture service determines whether this sequentially-next unit of recovery, following the latest unit of recovery in the data refresh operation, remains present in the capture cache. Based on the sequentially-next unit of recovery remaining present in the capture cache, the capture service can resume the data refresh operation from the sequentially-next unit of recovery by sending the sequentially-next unit of recovery to the target system. The refresh can proceed as if it were never halted.

This approach for refresh resume can be beneficial in situations where there are communication issues during the refresh of extremely large source data objects, since a temporary outage may occur after a high percentage of the data was refreshed.

While some log injection approaches provide for refresh restarts, this is in cases where the refresh data is being logged into the replication log and the existing bookmark controls the restart. In aspects described herein, additional coordination with the target engine is utilized in the form of additional bookmark information updated during refresh activities or target tracking during refresh apply processing to be used at the point of restart.

It is noted that the refresh approach herein is described from the perspective of a data refresh operation to refresh a source object to one or more targets, but this approach can be applied to several distinct data refresh operations involving different source objects and the respective subscription(s) thereto by corresponding target system(s).

Figure 2A:
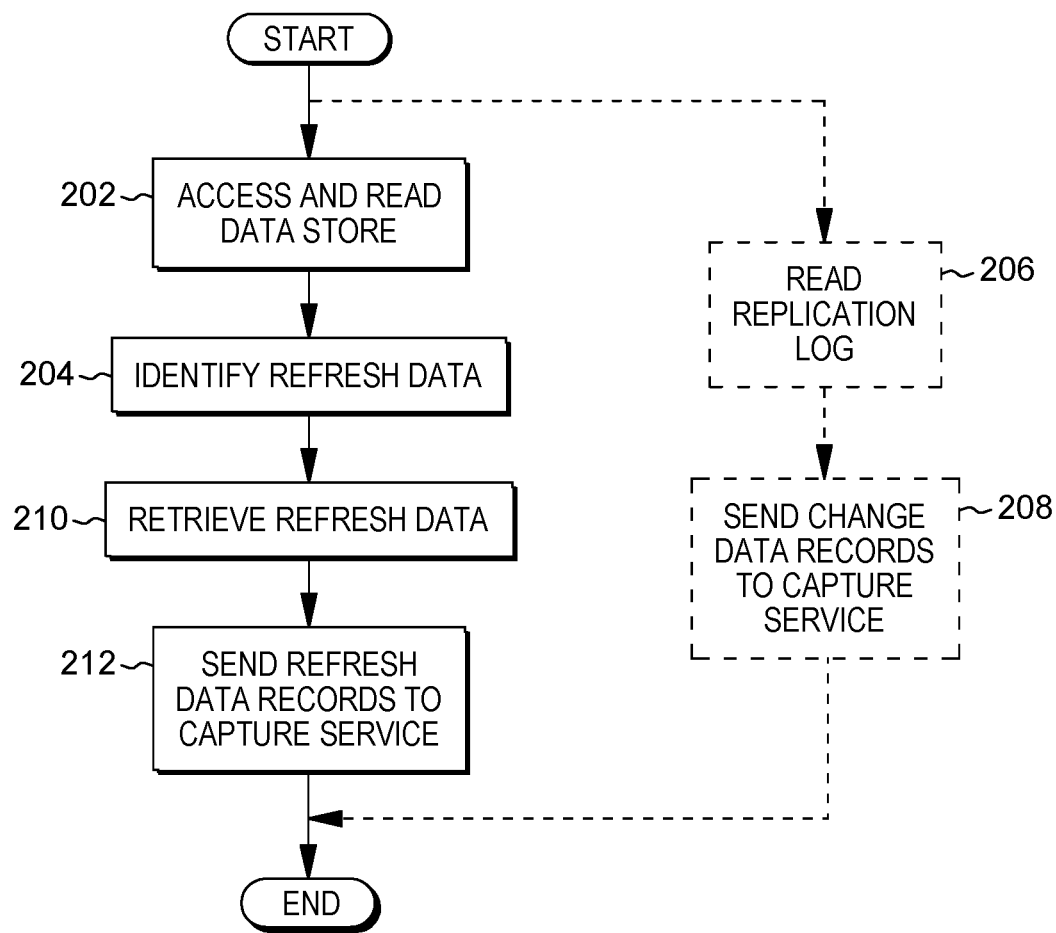
FIGS. 2A and 2B depict example processes for refresh processing in a replication environment, in accordance with aspects described herein.
Figure 2B:
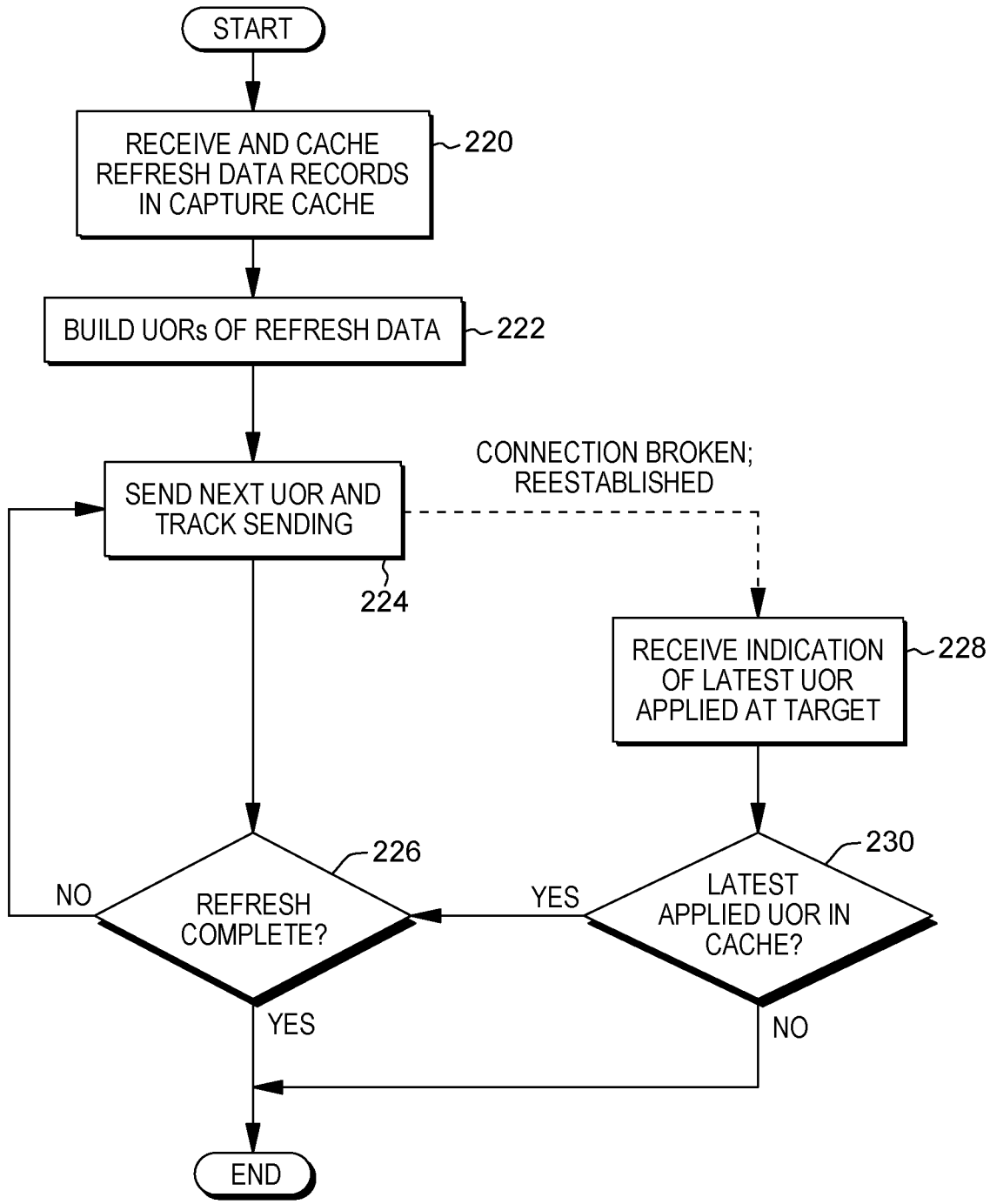

FIGS. 2A and 2B depict example processes for refresh processing in a replication environment, in accordance with aspects described herein. FIG. 2A presents an example process performed by a source side of a source-target replication relationship. In some examples, the process is performed by one or more computer systems, such as those described herein, which may include one or more computer systems executing a data services component.

The process accesses and reads (202), by a data services component of a replication environment as part of a data refresh operation, a data store. An example data store is a VSAM file and an example data services component is a VSAM data services component. The process identifies (204) refresh data, from a source object of a plurality of source objects of the data store, that is to be provided to a target system. The process also retrieves (210), by the data services component, the refresh data from the source object and sends (212) the refresh data as refresh data records to a capture service of the replication environment. In addition, and in connection with replication activity to replicate changes to the target, the data services component is further configured to perform processing to read (206) a replication log into which changes to one or more source objects of the plurality of source objects are recorded, and send (208) the changes as change data records to a capture service of the replication environment. In this regard, the data services component performs a log reading function in the replication environment.

The capture service is configured with data record handling routines for applying to received change data records (e.g. received via the sending 208), and is further configured to apply those data handling routines to the received refresh data records (e.g. received via the sending 212). The data record handling routines can include at least one selected from the group consisting of: exit handling, data transformation, flow control, and bad data handling, as examples.

The sending of the refresh data as refresh data records to the capture service by the data services component can include grouping subsets of the refresh data records into corresponding transactions for processing by the capture service data record handling routines for staging and sending to the target system as refresh transaction data flagged for refresh. This allows the capture service to make use of the replication data handling routines that already operate on transactions. It also facilitates potential refresh restart as described herein.

In some embodiments, the data refresh operation provides a range or differential refresh based on the data services component processing the data refresh records, the processing the data refresh records including at least one selected from the group consisting of: filtering and sorting the data refresh records.

In some cases, the source object from which the refresh data is identified is a source object of the one or more source objects for which changes are being monitored and logged into the replication log. Alternatively, the source object could be non-logged, where the source object is not one or the source object(s) for which changes are being monitored and logged into the replication log. In this case, changes to the source object are not recorded into the replication log for retrieval and sending as change data records by the data services component to the capture service, but the refresh data is retrieved from the source object and sent as the refresh data records to the capture service for data record handling as objects indicated as being refresh-only objects. The refresh data could be, for instance, retrieved from a point-in-time version of the data to be sent through a refresh stream to be handled by the capture service data handling routines as objects marked as refresh-only objects.

The data services component can execute on a first system of a first system architecture and the capture service can execute on a second system of a second system architecture the same or different from the first system architecture. The data services component could provide the change data records and the refresh data records to the capture service via a transmission channel between the first system and the second system.

The capture service can receive the refresh data records and send data of the refresh data records (to one or more target system(s)) for application to a plurality of different target objects. In some embodiments, the plurality of different target objects are on different target systems, where the capture service sends the data of the refresh data records to the different target systems, though the target objects could alternatively be on one target system.

FIG. 2B depicts an example process for refresh restart, in accordance with aspects described herein. In some embodiments, the process is performed by a capture service executing on a computer system. The process includes receiving and caching (220) refresh data records in a capture cache and building (222), from the cached refresh data records, groups of refresh data into units of recovery for staged sending to the target system. The capture service also sends and tracks (224) the sending of the units of recovery to the target system. The process sends a UOR and proceeds by determining (226) whether refresh is complete. The end of refresh records could be marked by an explicit communication message from the data services component, for example. If it is determined that refresh is complete (226, Y), the transmission of refresh data is complete and the process ends. Otherwise (226, N), the process returns to 224 to send a next UOR.

It may be that the data refresh operation becomes interrupted, for instance the connection between the capture service and the target system is broken. Based on this, and on the connection between the capture service and the target system subsequently being reestablished, the process proceeds to receive (228) from the target system an indication of a latest successfully-applied unit of recovery at the target system. The indication may be in the form of last-processed/applied unit of recovery restart information. The process then determines (230) whether this last-processed/applied unit of recovery remains present in the capture cache. Based on the last-processed/applied unit of recovery remaining present in the capture cache (230, Y), the process resumes the data refresh operation. The latest successfully-applied UOR may or may not have been a last UOR that is part of the current data refresh operation. Typically this can be determined based on whether the data services component indicates the end of the refresh or instead provides further refresh data for a sequentially-next UOR to send. Therefore, resuming the refresh can proceed in, e.g., one of two ways—either (i) continuing with UOR sending if there are more UOR(s) (which might mean waiting for the sequentially-next UOR to arrive at the capture component if it has not yet arrived) or (ii) completing the refresh, for instance if the data services component indicates an end of the refresh. Thus, the process continues to 226 to determine whether refresh is complete in this scenario, i.e. whether an end of refresh has been indicated. If so (226,Y) the process ends. Otherwise (226, N), the process proceeds by sending the sequentially-next unit of recovery when available to the target system and resuming the UOR delivery tracking. If instead at 230 is was determined that the latest successfully-applied UOR does not remain in the cache (230, N) the process ends, as refresh is not able to be resumed.

Although various examples are provided, variations are possible without departing from a spirit of the claimed aspects.

Figure 3:
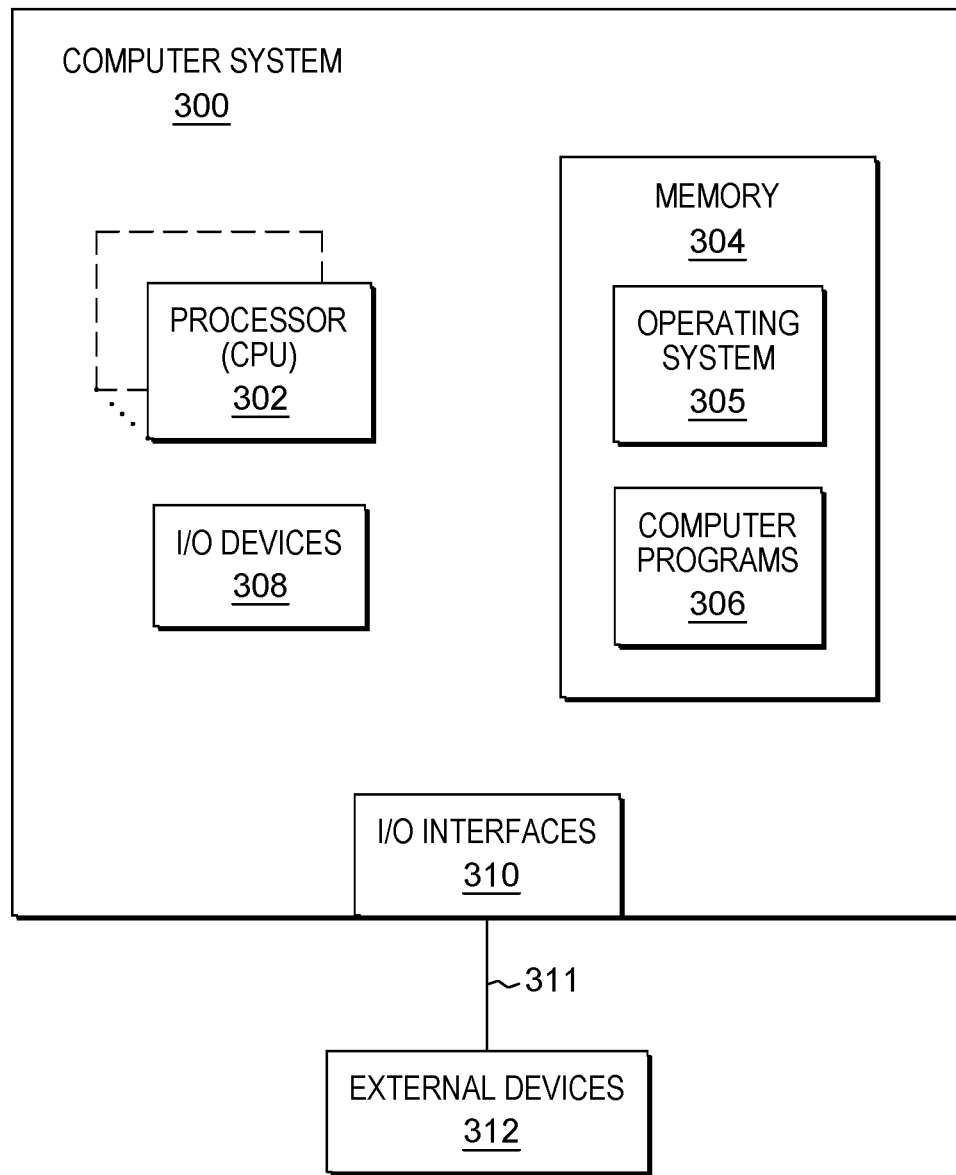
FIG. 3 depicts one example of a computer system and associated devices to incorporate and/or use aspects described herein.

Processes described herein may be performed singly or collectively by one or more computer systems, such as one or more computer systems of a replication environment. FIG. 3 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 3 shows a computer system 300 in communication with external device(s) 312. Computer system 300 includes one or more processor(s) 302, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 302 can also include register(s) to be used by one or more of the functional components. Computer system 300 also includes memory 304, input/output (I/O) devices 308, and I/O interfaces 310, which may be coupled to processor(s) 302 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 304 can be or include main or system memory (e.g. Random Access Memory) used in the execution of program instructions, storage device(s) such as hard drive(s), flash media, or optical media as examples, and/or cache memory, as examples. Memory 304 can include, for instance, a cache, such as a shared cache, which may be coupled to local caches (examples include L1 cache, L2 cache, etc.) of processor(s) 302. Additionally, memory 304 may be or include at least one computer program product having a set (e.g., at least one) of program modules, instructions, code or the like that is/are configured to carry out functions of embodiments described herein when executed by one or more processors.

Memory 304 can store an operating system 305 and other computer programs 306, such as one or more computer programs/applications that execute to perform aspects described herein. Specifically, programs/applications can include computer readable program instructions that may be configured to carry out functions of embodiments of aspects described herein.

Examples of I/O devices 308 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (312) coupled to the computer system through one or more I/O interfaces 310.

Computer system 300 may communicate with one or more external devices 312 via one or more I/O interfaces 310. Example external devices include a keyboard, a pointing device, a display, and/or any other devices that enable a user to interact with computer system 300. Other example external devices include any device that enables computer system 300 to communicate with one or more other computing systems or peripheral devices such as a printer. A network interface/adapter is an example I/O interface that enables computer system 300 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 310 and external devices 312 can occur across wired and/or wireless communications link(s) 311, such as Ethernet-based wired or wireless connections. Example wireless connections include cellular, Wi-Fi, Bluetooth®, proximity-based, near-field, or other types of wireless connections. More generally, communications link(s) 311 may be any appropriate wireless and/or wired communication link(s) for communicating data.

Particular external device(s) 312 may include one or more data storage devices, which may store one or more programs, one or more computer readable program instructions, and/or data, etc. Computer system 300 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 300 may be operational with numerous other general purpose or special purpose computing system environments or configurations. Computer system 300 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
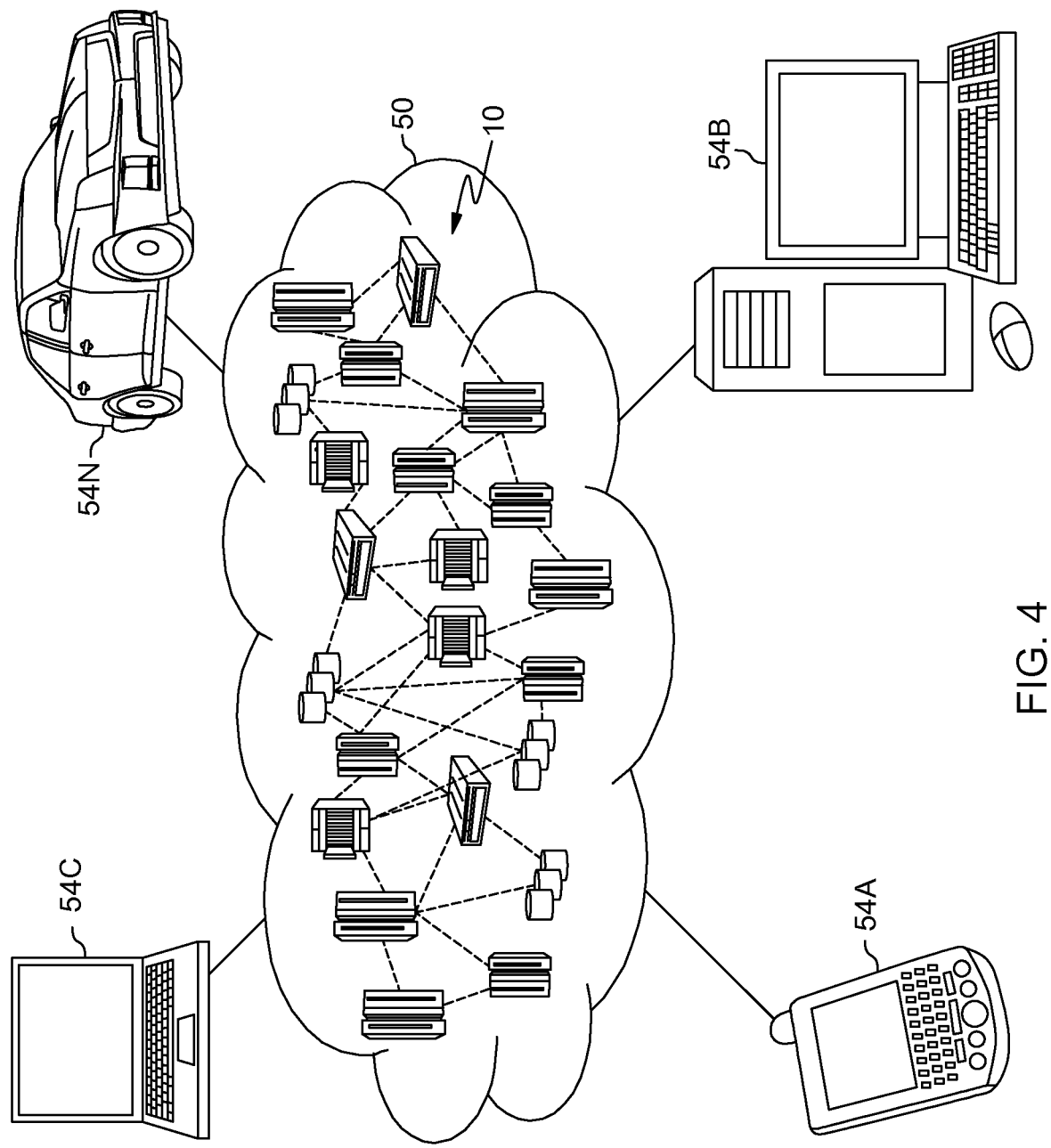
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
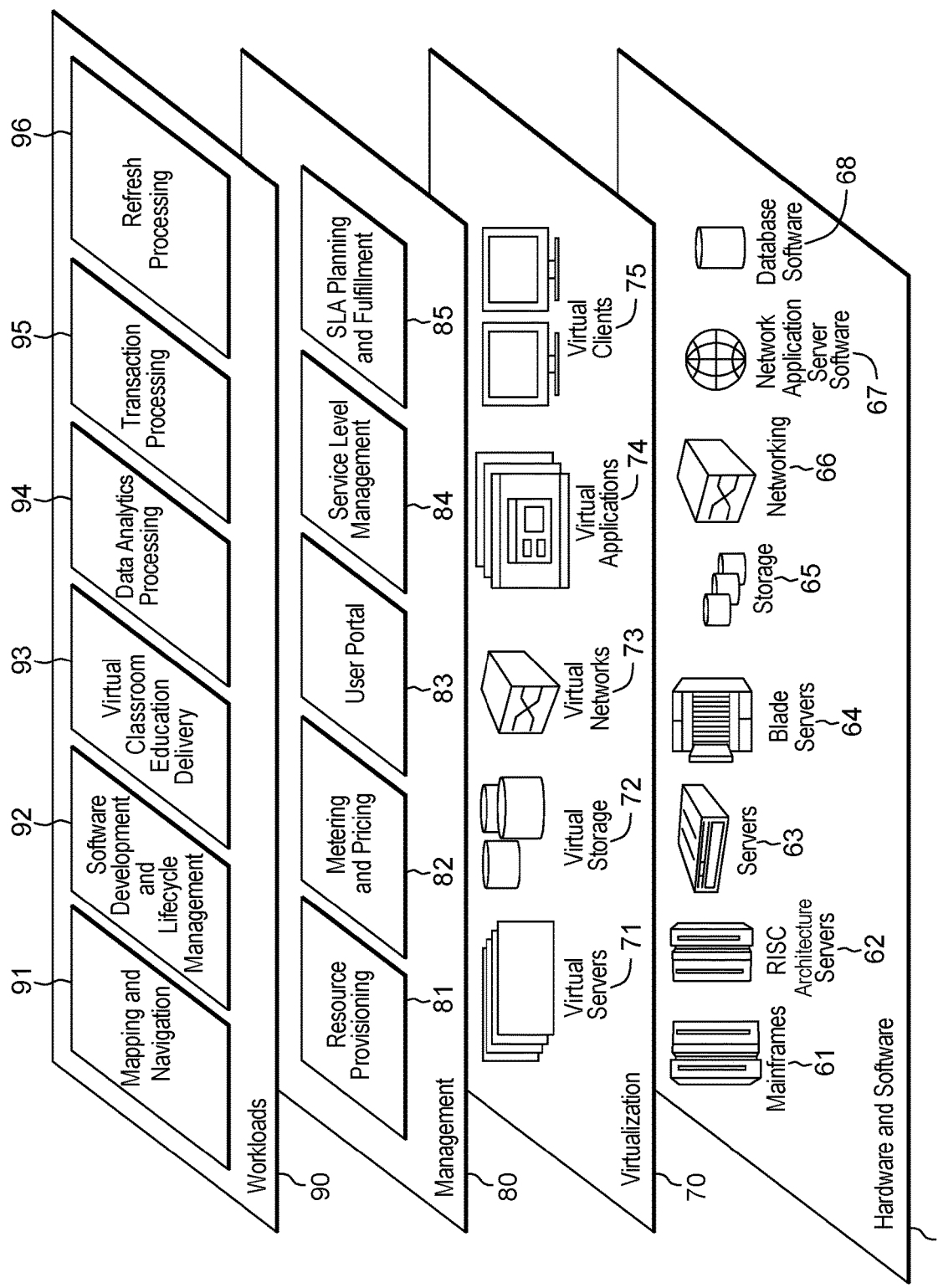
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and refresh processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
reading, by a data services component of a replication environment in which a replication relationship exists between a source side comprising one or more systems and a target side comprising a target system, and as part of a data refresh operation, a data store and identifying refresh data, from a source object of a plurality of source objects of the data store, that is to be provided to the target system, wherein the data services component is further configured to read a replication log into which changes to one or more source objects of the plurality of source objects are recorded, and send the changes as change data records to a capture service of the replication environment; and
retrieving, by the data services component, the refresh data from the source object and sending the refresh data as refresh data records to the capture service of the replication environment, wherein the capture service executes on a system of the one or more systems of the source side and is configured to send the change data to the target system of the target side based on receiving the change data records and send the refresh data to the target system of the target side based on receiving the refresh data records, and is further configured with data record handling routines for applying to received change data records, and wherein the capture service is further configured to apply those data handling routines to the received refresh data records.

2. The method of claim 1, wherein the data record handling routines comprise at least one selected from the group consisting of: exit handling, data transformation, flow control, and bad data handling.

3. The method of claim 1, wherein the source object is non-logged, in which changes to the source object are not recorded into the replication log for retrieval and sent as change data records by the data services component to the capture service, but the refresh data is retrieved from the source object and sent as the refresh data records to the capture service for data record handling as objects indicated as being refresh-only objects.

4. The method of claim 1, wherein the source object is a source object of the one or more source objects for which changes are being monitored and logged into the replication log.

5. The method of claim 1, wherein the capture service receives the refresh data records and sends data of the refresh data records for application to a plurality of different target objects.

6. The method of claim 5, wherein the plurality of different target objects are on different target systems, wherein the capture service sends the data of the refresh data records to the different target systems.

7. The method of claim 1, wherein the capture service is further configured to cache refresh data records in a capture cache and build from the cached refresh data records groups of refresh data into units of recovery for staged sending to the target system.

8. The method of claim 7, wherein the capture service is further configured to perform tracking sending of the units of recovery to the target system and, based on the data refresh operation being interrupted and a connection between the capture service and the target system subsequently being reestablished:
receiving from the target system an indication of a latest unit of recovery in the data refresh operation that was successfully applied at the target system;
determining whether the latest successfully-applied unit of recovery remains present in the capture cache; and
based on the latest successfully-applied unit of recovery remaining present in the capture cache, resuming the data refresh operation, the resuming comprising one selected from the group consisting of: (i) continuing with unit of recovery sending from a sequentially-next unit of recovery, following the latest successfully-applied unit of recovery, by sending the sequentially-next unit of recovery to the target system, and (ii) completing the data refresh operation based on the data services component indicating an end of the data refresh operation.

9. The method of claim 1, wherein the data services component executes on a first system of a first system architecture and the capture service executes on a second system of a second system architecture different from the first system architecture, and wherein the data services component provides the change data records and the refresh data records to the capture service via a transmission channel between the first system and the second system.

10. The method of claim 1, wherein the sending the refresh data as refresh data records to the capture service by the data services component comprises grouping subsets of the refresh data records into corresponding transactions for processing by the capture service data record handling routines for staging and sending to the target system as refresh transaction data flagged for refresh.

11. The method of claim 1, wherein the data refresh operation provides a range or differential refresh based on the data services component processing the data refresh records, the processing the data refresh records comprising at least one selected from the group consisting of: filtering and sorting the data refresh records.

12. A computer system comprising:
a memory; and
a processor in communication with the memory, wherein the computer system is configured to perform a method comprising:
reading, by a data services component of a replication environment in which a replication relationship exists between a source side comprising one or more systems and a target side comprising a target system, and as part of a data refresh operation, a data store and identifying refresh data, from a source object of a plurality of source objects of the data store, that is to be provided to the target system, wherein the data services component is further configured to read a replication log into which changes to one or more source objects of the plurality of source objects are recorded, and send the changes as change data records to a capture service of the replication environment; and retrieving, by the data services component, the refresh data from the source object and sending the refresh data as refresh data records to the capture service of the replication environment, wherein the capture service executes on a system of the one or more systems of the source side and is configured to send the change data to the target system of the target side based on receiving the change data records and send the refresh data to the target system of the target side based on receiving the refresh data records, and is further with data record handling routines for applying to received change data records, and wherein the capture service is further configured to apply those data handling routines to the received refresh data records.

13. The system of claim 12, wherein the data record handling routines comprise at least one selected from the group consisting of: exit handling, data transformation, flow control, and bad data handling.

14. The system of claim 12, wherein the source object is non-logged, in which changes to the source object are not recorded into the replication log for retrieval and sent as change data records by the data services component to the capture service, but the refresh data is retrieved from the source object and sent as the refresh data records to the capture service for data record handling as objects indicated as being refresh-only objects.

15. The system of claim 12, wherein the capture service receives the refresh data records and sends data of the refresh data records for application to a plurality of different target objects, wherein the plurality of different target objects are on different target systems, and wherein the capture service sends the data of the refresh data records to the different target systems.

16. The system of claim 12, wherein the capture service is further configured to cache refresh data records in a capture cache and build from the cached refresh data records groups of refresh data into units of recovery for staged sending to the target system, and perform:

tracking sending of the units of recovery to the target system; and based on the data refresh operation being interrupted and a connection between the capture service and the target system subsequently being reestablished:

receiving from the target system an indication of a latest unit of recovery in the data refresh operation that was successfully applied at the target system;

determining whether the latest successfully-applied unit of recovery remains present in the capture cache; and based on the latest successfully-applied unit of recovery remaining present in the capture cache, resuming the data refresh operation, the resuming comprising one selected from the group consisting of: (i) continuing with unit of recovery sending from a sequentially-next unit of recovery, following the latest successfully-applied unit of recovery, by sending the sequentially-next unit of recovery to the target system, and (ii) completing the data refresh operation based on the data services component indicating an end of the data refresh operation.

17. A computer program product comprising:

a computer readable storage medium readable by a processing circuit and storing instructions for execution by the processing circuit for performing a method comprising:

reading, by a data services component of a replication environment in which a replication relationship exists between a source side comprising one or more systems and a target side comprising a target system, and as part of a data refresh operation, a data store and identifying refresh data, from a source object of a plurality of source objects of the data store, that is to be provided to the target system, wherein the data services component is further configured to read a replication log into which changes to one or more source objects of the plurality of source objects are recorded, and send the changes as change data records to a capture service of the replication environment; and retrieving, by the data services component, the refresh data from the source object and sending the refresh data as refresh data records to the capture service of the replication environment, wherein the capture service executes on a system of the one or more systems of the source side and is configured to send the change data to the target system of the target side based on receiving the change data records and send the refresh data to the target system of the target side based on receiving the refresh data records, and is further configured with data record handling routines for applying to received change data records, and wherein the capture service is further configured to apply those data handling routines to the received refresh data records.

18. The computer program product of claim 17, wherein the source object is non-logged, in which changes to the source object are not recorded into the replication log for retrieval and sent as change data records by the data services component to the capture service, but the refresh data is retrieved from the source object and sent as the refresh data records to the capture service for data record handling as objects indicated as being refresh-only objects.

19. The computer program product of claim 17, wherein the capture service receives the refresh data records and sends data of the refresh data records for application to a plurality of different target objects, wherein the plurality of different target objects are on different target systems, and wherein the capture service sends the data of the refresh data records to the different target systems.

20. The computer program product of claim 17, wherein the capture service is further configured to cache refresh data records in a capture cache and build from the cached refresh data records groups of refresh data into units of recovery for staged sending to the target system, and perform:

tracking sending of the units of recovery to the target system; and based on the data refresh operation being interrupted and a connection between the capture service and the target system subsequently being reestablished:

receiving from the target system an indication of a latest unit of recovery in the data refresh operation that was successfully applied at the target system;

determining whether the latest successfully-applied unit of recovery remains present in the capture cache; and based on the latest successfully-applied unit of recovery remaining present in the capture cache, resuming the data refresh operation, the resuming comprising one selected from the group consisting of: (i) continuing with unit of recovery sending from a sequentially-next unit of recovery, following the latest successfully-applied unit of recovery, by sending the sequentially-next unit of recovery to the target system, and (ii) completing the data refresh operation based on the data services component indicating an end of the data refresh operation.

* * * * *